US009369961B2

(12) United States Patent
Berggren et al.

(10) Patent No.: US 9,369,961 B2
(45) Date of Patent: Jun. 14, 2016

(54) USER EQUIPMENT, CELLULAR COMMUNICATION NETWORK NODE AND METHOD OF CONTROLLING OPERATION OF A USER EQUIPMENT

(71) Applicant: Sony Corporation, Tokyo (JP)

(72) Inventors: Anders Berggren, Lund (SE); Lars Nord, Lund (SE); Brian Alexander Martin, Surrey (GB); Yuichi Morioka, Reading (GB)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 14/296,583

(22) Filed: Jun. 5, 2014

(65) Prior Publication Data
US 2015/0358907 A1    Dec. 10, 2015

(51) Int. Cl.
*H04M 3/00*    (2006.01)
*H04W 52/02*   (2009.01)
*H04W 28/02*   (2009.01)
*H04W 76/04*   (2009.01)
*H04W 84/18*   (2009.01)
*H04W 88/04*   (2009.01)

(52) U.S. Cl.
CPC ...... *H04W 52/0235* (2013.01); *H04W 52/0229* (2013.01); *H04W 52/0254* (2013.01); *H04W 28/0221* (2013.01); *H04W 76/048* (2013.01); *H04W 84/18* (2013.01); *H04W 88/04* (2013.01); Y02B 60/50 (2013.01)

(58) Field of Classification Search
CPC ......... H04W 8/00; H04W 8/005; H04W 8/16; H04W 12/00; H04W 48/14; H04W 48/16; H04W 52/02; H04W 52/04; H04W 56/00; H04W 56/0005; H04W 56/001; H04W 88/00; H04W 88/02; H04W 4/005; H04W 52/0254; H04W 52/0229; H04W 52/0221
USPC .............. 455/410, 411, 415, 420, 552.1, 557, 455/445, 522, 574
See application file for complete search history.

(56) References Cited

U.S. PATENT DOCUMENTS

| | | | | |
|---|---|---|---|---|
| 2005/0239451 | A1* | 10/2005 | Periyalwar | H04W 52/383 455/425 |
| 2006/0168343 | A1* | 7/2006 | Ma | H04W 52/38 709/245 |
| 2010/0261469 | A1* | 10/2010 | Ribeiro | H04W 99/00 455/423 |
| 2012/0163235 | A1* | 6/2012 | Ho et al. | 370/254 |
| 2013/0122893 | A1* | 5/2013 | Turtinen et al. | 455/423 |
| 2013/0184024 | A1* | 7/2013 | Chen | H04W 76/023 455/509 |

(Continued)

OTHER PUBLICATIONS

3GPP TS 36.304 V12.0.0 (Mar. 2014). "3rd Generation Partnership Project; Technical Specification Group Radio Access Network; Evolved Universal Terrestrial Radio Access (R-UTRA); User Equipment (UE) procedures in idle mode (Release 12)." dated Mar. 19, 2014.

(Continued)

*Primary Examiner* — Jean Gelin
(74) *Attorney, Agent, or Firm* — Renner, Otto, Boisselle & Sklar LLP

(57) ABSTRACT

A user equipment comprises a wireless interface for communication with a cellular communication network. The user equipment has different operating states which include a power saving state. Transitions between the power saving state and a further operating state different from the power saving state may be triggered by a device-to-device signal received directly from a further user equipment.

19 Claims, 8 Drawing Sheets

(56) References Cited

U.S. PATENT DOCUMENTS

| | | | |
|---|---|---|---|
| 2013/0201954 A1* | 8/2013 | Gao | H04W 72/0413 370/329 |
| 2013/0272182 A1* | 10/2013 | Li et al. | 370/311 |
| 2013/0272294 A1* | 10/2013 | Mildh et al. | 370/350 |
| 2014/0031063 A1* | 1/2014 | Park | H04W 4/005 455/456.1 |
| 2015/0045018 A1* | 2/2015 | Liu | H04L 1/00 455/426.1 |
| 2015/0065154 A1* | 3/2015 | Van Phan | H04W 72/042 455/450 |
| 2015/0078466 A1* | 3/2015 | Zhou et al. | 375/260 |
| 2015/0119088 A1* | 4/2015 | Lee et al. | 455/458 |

OTHER PUBLICATIONS

3GPP TS 25.304 V12.1.0 (Mar. 2014). "3rd Generation Partnership Project; Technical Specification Group Radio Access Network; User Equipment (UE) procedures in idle mode. and procedures for cell reselection in connected mode (Release 12)." Dated Mar. 19, 2014.

3GPP TR 23.703 V12.0.0 (Feb. 2014). 3rd Generation Partnership Project; Technical Specification Group Services and System Aspects; Study on architecture enhancements to support Proximity-based Services (ProSe) (Release 12). Dated Mar. 10, 2014.

3GPP TR 37.869 V12.0.0 (Sep. 2013). "3rd Generation Partnership Project; Technical Specification Group Radio Access Network; Study on Enhancements to Machine-Type Communications (MTC) and other Mobile Data Applications; Radio Access Network (RAN) aspects (Release 12)." Dated Sep. 19, 2013.

3GPP TR 23.887 V12.0.0 (Dec. 2013). "3rd Generation Partnership Project; Technical Specification Group Services and System Aspects; Study on Machine Type Communications (MTC) and other mobile data applications communications enhancements (Release 12)." Dated Dec. 20, 2013.

3GPP TS 25.331 V12.1.0 (Mar. 2014). "3rd Generation Partnership Project; Technical Specification Group Radio Access Network; Radio Resources Control (RRC); Protocol specification (Release 12)." Dated Mar. 20, 2014.

3GPP TSG-RAN Meeting #62. Busan, South Korea, Dec. 3-6, 2013. ZTE. "Rp-132053. New WI Proposal: RAN enhancements for Machine-Type and other mobile data applications communications". Dated May 12, 2013.

3GPP TSG-RAN WG2 Meeting #85bis. Valencia, Spain, Mar. 31-Apr. 4, 2014. ZTE, Sony, Samsung, Interdigital, Intel, CATT, Ericsson, Huawei, HiSilicon. "R2-141764. Intoduction of support for UE power saving mode." Dated Apr. 4, 2014.

3GPP TSG-RAN WG2 Meeting #85bis. Valencia, Spain, Mar. 31-Apr. 4, 2014. ZTE, Sony, Samsung, Interdigital, Intel, CATT, Ericsson, Huawei, HiSilicon. "R2-141765. Intoduction of support for UE power saving mode." Dated Apr. 4, 2014.

3GPP TSG-RAN WG2 Meeting #85bis. Mar. 31-Apr. 4, 2014, Valencia, Spain. Intel Corporation. "R2-141210. Discussion on the introduction of the Power Saving Mode in RAN specifications and related open aspects." Dated Mar. 21, 2014.

3GPP TSG RAN Meeting #63. Fukuoka, Japan, Mar. 3-6, 2014. Qualcomm Incorporated. "RP-140518. Work item proposal on LTE Device to Device Proximity Services." Dated Mar. 6, 2014.

3GPP TSG-RAN WG2 Meeting #85bis. Valencia , Spain, Mar. 31-Apr. 4. Sony. "R2-141291. Power Saving State for MTC" Dated Mar. 21, 2014.

3GPP TSG-RAN WG2 Meeting #85bis. Valencia, Spain, Mar. 31-Apr. 4, 2014. Ericsson. "R2-141313. Impact of Power Saving Mode on RAN." Dated Mar. 21, 2014.

* cited by examiner

USER EQUIPMENT, CELLULAR COMMUNICATION NETWORK NODE AND METHOD OF CONTROLLING OPERATION OF A USER EQUIPMENT

FIELD OF THE INVENTION

Embodiments of the invention relate to wireless communication. Embodiments of the invention relate in particular to a user equipment configured for communication with a cellular communication network, to a cellular communication network node and to methods performed by such devices to control transitions between different operating states of the user equipment.

BACKGROUND OF THE INVENTION

With increasing popularity of mobile voice and data communication, there is an ever increasing demand for high-speed data communication. User equipment configured to connect to a communication network, e.g. smartphones, have advanced processing capabilities.

For battery powered user equipments, power consumption is of significant importance in order to increase battery lifetime. For certain use cases, the total battery lifetime requirements may be challenging to meet. One exemplary scenario which imposes demanding battery lifetime requirements is machine-to-machine (M2M) communication.

To reduce modem power consumption, the user equipment may be set to different states. For illustration, 3GPP specification TS 25.331 V12.1.0 (2014-03) entitled "3rd Generation Partnership Project; Technical Specification Group Radio Access Network; Radio Resource Control (RRC); Protocol specification (Release 12)" defines different RRC states in sections 7.1 and 7.2. The mobile terminal may enter some of these states autonomously, e.g. when a timer expires.

A further reduction in power consumption may be achieved when the user equipment has a power saving state in which an access stratum (AS) layer of the user equipment is deactivated. The user equipment may stop performing or may reduce AS functions such as monitoring paging and system information, performing measurements and cell reselection procedures in the network. The user equipment may optionally perform tracking area update (TAU) procedures or other procedures in a periodic manner.

Such a power saving state improves power consumption and increases the battery lifetime. However, one problem associated with the power saving state is that the user equipment may not be reachable for the cellular communication network when the user equipment is in this state. Some user equipments may have long sleep periods which, e.g. sleep periods in excess of one hour, sleep periods in excess of one day or even sleep periods in excess of one month. Typical examples include machine-to-machine (M2M) terminals. For illustration, some M2M terminals may provide a machine reading only once in several months. If an operator wants to perform an update on the M2M terminal, e.g. a software or firmware update, the operator may need to wait for a long period until the M2M terminal re-attaches to the cellular communication network and the update can be performed.

BRIEF SUMMARY OF THE INVENTION

There is a continued need in the art for devices and methods in which power consumption of a user equipment may be kept low in a power saving state while providing the network with enhanced control over the user equipment even when the user equipment is in a power saving state.

According to embodiments, a user equipment has a power saving state and is configured to be woken up from the power saving state by device-to-device signals which are received directly from a further user equipment. This allows a cellular communication network to wake up the user equipment by requesting the further user equipment to relay a device-to-device discovery signal or a device-to-device communication signal or a device-to-device synchronization signal to the user equipment, in order to wake up the user equipment from a power saving state.

The power saving state may be a state in which the user equipment is not reachable for the cellular communication network. The power saving state may be a state in which an access stratum (AS) is deactivated. The power saving state may be a state in which the user equipment is not reachable by the cellular communication network. The device-to-device discovery signal or the device-to-device communication signal or the device-to-device synchronization signal may cause the user equipment to make a transition from the power saving state to a further state. The further state may be an RRC idle state in which the user equipment is configured to receive and process paging signals from the cellular communication network. The further state may be an RRC connected state.

The devices, methods and systems described herein may be used to wake up a user equipment from a power saving state using device-to-device signals. The power saving state may be a deep sleep state in which the user equipment is prevented from being woken up by signals which are directly received from the base station of the cellular communication network.

A user equipment according to an embodiment comprises a wireless interface for communication with a cellular communication network. The user equipment comprises a control logic configured to control transitions of the user equipment between different operating states which include a power saving state. The control logic is configured to process a device-to-device signal received directly from a further user equipment at the wireless interface and to selectively control, in response to the device-to-device signal, a transition of the user equipment between the power saving state and a further operating state different from the power saving state.

The power saving state may be a state in which an access stratum is deactivated or at least some of the access stratum functions are deactivated or reduced.

The power saving state may be a state in which an access stratum is deactivated or at least some functions of the access stratum are reduced, and the user equipment is registered with the cellular communication network at a non-access stratum (NAS) layer.

The user equipment may be configured to at least intermittently listen for the device-to-device signals after it entered the power saving state.

The control logic may be configured to selectively activate the access stratum in response to the device-to-device signal.

The further state may be a Radio Resource Control (RRC) idle state in which the access stratum is activated.

The further state may be a Radio Resource Control (RRC) connected state.

The control logic may be configured to control the wireless interface such that the user equipment makes a transition from the power saving state to the RRC idle state in response to the device-to-device signal.

A power consumption of the user equipment in the power saving state may be less than a power consumption of the user equipment in the RRC idle state.

The control logic may be configured to control the wireless interface to perform a tracking area update (TAU) procedure in response to the device-to-device signal.

The control logic may be configured to control the wireless interface to perform the TAU procedure in response to the device-to-device signal and upon expiry of a timer.

The control logic may be configured to determine whether the device-to-device signal indicates that the user equipment is to be set to the further operating state to receive paging signals from the cellular communication network in at least a pre-defined time interval.

The control logic may be configured to apply a filter mask to the device-to-device signal to determine whether the user equipment shall be set to the further operating state to receive the paging signals in at least the pre-defined time interval.

The further state may be an RRC connected state.

The control logic may be configured to control the wireless interface such that the user equipment makes a transition from the power saving state to the RRC connected state.

The control logic may be configured to control a transition from the power saving state to the RRC connected state in response to detecting that the device-to-device signal includes paging information.

The user equipment may be configured to transmit a message to a node of the cellular communication network before the user equipment enters the power saving state. The message may comprise an indicator indicating that the user equipment is operative to be woken up by the device-to-device signal when the user equipment operates in the power saving mode.

The message which comprises the indicator indicating that the user equipment is operative to be woken up by the device-to-device signal may be an attach/TAU request message.

The message which comprises the indicator indicating that the user equipment is operative to be woken up by the device-to-device signal may be an RRC message, for example UE ASSISTANCE INFORMATION.

The device-to-device signal by which the user equipment can be caused to make a transition between the power saving state and the further state may be a device-to-device communication signal.

The device-to-device signal by which the user equipment can be caused to make a transition between the power saving state and the further state may be a device-to-device discovery signal.

The device-to-device signal by which the user equipment can be caused to make a transition between the power saving state and the further state may be a device-to-device synchronization signal including an indication that the user equipment shall wake up.

The user equipment may be a terminal for machine-to-machine communication.

A cellular communication network node according to an embodiment comprises an interface configured to receive a message transmitted by a user equipment. The cellular communication network node comprises a processing device coupled to the interface and configured to determine whether the message includes an indicator which indicates that the user equipment, when operating in a power saving state, is operative to be woken up by a device-to-device signal via a further user equipment. When the message includes the indicator which indicates that the user equipment may be woken up by the device-to-device signal, the cellular communication network node may be configured to cause a further user equipment to transmit the device-to-device signal to the user equipment to wake up the user equipment from the power saving state.

The cellular communication network node may be a Mobility Management Entity (MME).

The processing device may be configured to select the further user equipment from a group of active user equipments.

The further user equipment may be included in a group of user equipments for device-to-device communication. The further user equipment may be a group head of the group of user equipments for device-to-device communication. The further user equipment may be different from the group head of the group of user equipments for device-to-device communication.

The processing device may be configured to select the further user equipment such that the further user equipment is connected to an electric power grid.

The cellular communication network node may cause the further user equipment to relay a further message from the cellular communication network node on to the user equipment as the device-to-device signal.

The further message may comprise a device-to-device filter mask value which requests the user equipment to wake up from the power saving state so as to monitor paging signals and/or system information from the cellular communication network.

The message with the indicator may be an attach/TAU request message. The indicator may be a flag of the attach/TAU request message. The message may comprise one or several additional parameters, including a timer value for a periodic TAU of the user equipment.

A communication system according to an embodiment comprises the cellular communication network node according to an embodiment and a user equipment according to an embodiment.

The communication system may further comprise a further user equipment which is configured to transmit a device-to-device signal to the user equipment to wake up the user equipment from the power saving state to the further state in which the user equipment is configured to monitor paging signals and system information transmitted by the cellular communication network.

A method of controlling operation of a user equipment comprises receiving, by a wireless interface of the user equipment, a device-to-device signal directly from a further user equipment. The wireless interface of the user equipment may be configured for communication with a cellular communication network. A control logic of the user equipment may process the received device-to-device signal. The control logic of the user equipment my control a transition of the user equipment between a power saving state and a further operating state different from the power saving state in dependence on the processed received device-to-device signal.

In the method, the power saving state may be a state in which an access stratum is deactivated. The power saving state may be a state in which an access stratum is deactivated and the user equipment is registered with the cellular communication network at a NAS layer.

In the method, the control logic may selectively activate the access stratum in response to the device-to-device signal. While the user equipment operates in the power saving state, the access stratum layer may be in a deep sleep state in which it is only operable to receive the device-to-device signals, but no signals directly from the cellular communication network.

In the method, the control logic may control the wireless interface such that the user equipment makes a transition from the power saving state to the RRC idle state in response to the device-to-device signal.

In the method, a power consumption of the user equipment in the power saving state may be less than a power consumption of the user equipment in the RRC idle state. In the method, a power consumption of the user equipment in the power saving state may be less than a power consumption of the user equipment in the RRC Connected state.

In the method, the control logic may be configured to control the wireless interface to perform a TAU procedure in response to the device-to-device signal.

In the method, the control logic may be configured to control the wireless interface to perform the TAU procedure in response to the device-to-device signal and upon expiry of a timer.

In the method, the control logic may be configured to control the wireless interface to perform data transmission in response to the device-to-device signal. The data transmission may include delay tolerant data.

In the method, the control logic may be configured to determine whether the device-to-device signal indicates that the user equipment is to be set to the further operating state to monitor paging signals from the cellular communication network in at least a pre-defined time interval.

In the method, the control logic may be configured to apply a filter mask to the device-to-device signal to determine whether the user equipment shall be set to the further operating state to receive the paging signals in at least the pre-defined time interval.

In the method, the further state may be an RRC connected state.

In the method, the control logic may control the wireless interface such that the user equipment makes a transition from the power saving state to the RRC connected state. The control logic may control the wireless interface such that the user equipment makes a transition from the power saving state to the RRC connected state in response to detecting that the device-to-device signal includes paging information.

In the method, the wireless interface may transmit a message to a node of the cellular communication network before the user equipment enters the power saving state. The message may comprise an indicator indicating that the user equipment is operative to be woken up by the device-to-device signal when the user equipment operates in the power saving mode.

In the method, the message may be an attach/TAU request message.

In the method, the device-to-device signal by which the user equipment can be caused to make a transition between the power saving state and the further state may be a device-to-device communication signal.

In the method, the device-to-device signal by which the user equipment can be caused to make a transition between the power saving state and the further state may be a device-to-device discovery signal.

In the method, the device-to-device signal by which the user equipment can be caused to make a transition between the power saving state and the further state may be a device-to-device synchronization signal with added payload which indicates that the user equipment shall wake up.

In the method, the user equipment may be a terminal for machine-to-machine communication.

Devices and methods according to embodiments allow a user equipment to operate in a power saving state. A node of a cellular communication network may wake up the user equipment from the power saving state by requesting a further user equipment to transmit a device-to-device discovery signal or a device-to-device communication signal or a device-to-device synchronization signal with an indicator for wake-up to the user equipment, which indicates that the user equipment shall start monitoring paging signals or shall otherwise be reachable for the cellular communication network. Enhanced control over the user equipment is attained even when the user equipment is in a power saving mode in which the access stratum is deactivated, for example.

BRIEF DESCRIPTION OF THE DRAWINGS

Embodiments of the invention will be described with reference to the accompanying drawings in which the same or similar reference numerals designate the same or similar elements.

DESCRIPTION OF EMBODIMENTS

Exemplary embodiments of the invention will be described with reference to the drawings. While some embodiments will be described in the context of specific fields of application, e.g. in the context of exemplary radio access technologies, the embodiments are not limited to this field of application. The features of the various embodiments may be combined with each other unless specifically stated otherwise.

Figure 1:
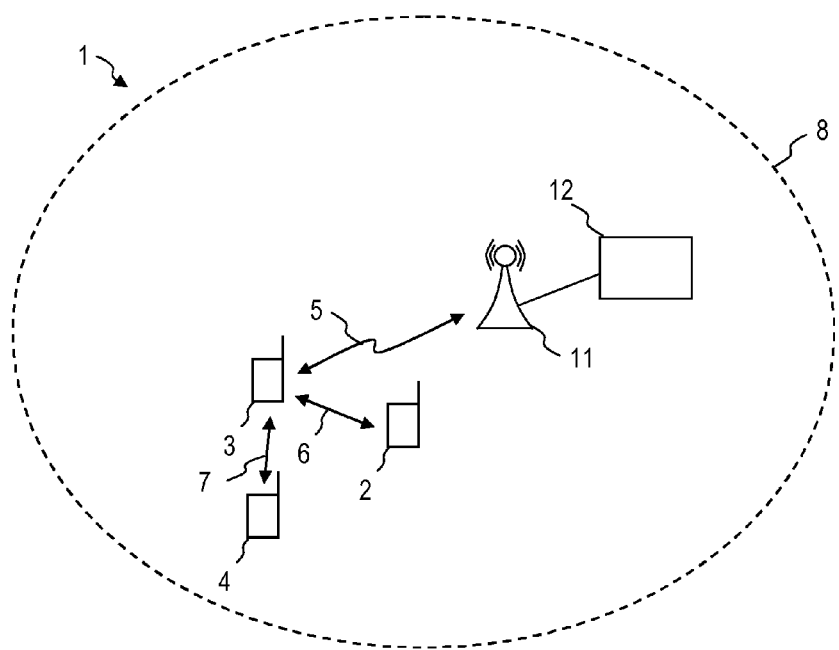
FIG. 1 is a schematic view of a communication system according to an embodiment.

FIG. 1 is a schematic view of a communication system 1 according to an embodiment. The communication system 1 comprises a user equipment 2. The communication system 1 may comprise further user equipments 3, 4. The communication system 1 comprises a cellular communication network. The cellular communication network has a radio access network (RAN). The radio access network includes a plurality of base stations, with a base station 11 being shown in FIG. 1. The base station 11 may be operatively coupled to other nodes of the cellular communication network. The cellular communication network may comprise a Mobility Management Entity (MME) 12, for example. The specific configuration of the cellular communication network, of the base station 11 and of the other nodes of the cellular communication network depends on the communication standard. For illustration, the cellular communication network may be a Universal Mobile Telecommunications System (UMTS) network. In this case, the RAN is a UMTS Terrestrial Radio Access Network (UTRAN), with the base station 11 being a NodeB which may be connected to a Radio Network Controller (RNC). The cellular communication network may be a Long Term Evolution (LTE) network. In this case, the RAN is an evolved UTRAN (eUTRAN), with the base station being an evolved Node B (eNodeB), and the node 12 being a MME and/or Serving Gateway (S-GW) in the core network.

As will be described in more detail below, the user equipment 2 has a wireless interface configured for communication with the RAN of the cellular communication network. The user equipment 2 may be configured to perform device-to-device discovery and device-to-device communication over the wireless interface. In device-to-device discovery, the user equipment 2 may discover a further user equipment 3, 4 in proximity to the user equipment 2. In device-to-device communication, the user equipment 2 may transmit or receive device-to-device packets over the wireless interface. The wireless interface may be configured for communication over the eUTRA air interface.

The user equipment 2 has several operating states. The operating states include a power saving state. The power saving state may be a state in which the user equipment 2 does not monitor paging signals or system information transmitted by the cellular communication network. The power saving state may be a state in which an access stratum (AS) is deactivated. Power consumption may thereby be kept small.

In order to allow the cellular communication network to reach the user equipment 2 even when the user equipment is in the power saving state, the user equipment 2 may be operative such that a transition from the power saving state or into the power saving state may be triggered by a device-to-device signal 6 which is received by the user equipment from the further user equipment 3. The device-to-device signal 6 may be a device-to-device discovery signal which includes a mask value or other indicator to indicate that the user equipment 2 shall change from the power saving state to a further operating state. The device-to-device signal 6 may be a device-to-device communication signal which includes a mask value or other indicator to indicate that the user equipment 2 shall change from the power saving state to a further operating state. The device-to-device signal 6 may be a device-to-device synchronization signal which includes payload having an indicator to indicate that the user equipment 2 shall change from the power saving state to a further operating state. For illustration, the user equipment 2 may be caused to perform a TAU procedure in which it can be reached by the cellular communication network by temporarily changing into an RRC idle state in which the AS is activated. The user equipment 2 may be caused to change into the RRC idle state or even the RRC connected state by the receipt of the device-to-device signal 6.

The MME 12 may cause the further user equipment 3 to transmit the device-to-device signal which triggers the user equipment 2 to change its operating state. The MME 12 may transmit a request message to the further user equipment 3. The request message may include a filter mask value for a device-to-device filter mask which can be used by the further user equipment 3 to generate the device-to-device signal 6 which triggers the user equipment 2 to change its state.

Figure 2:
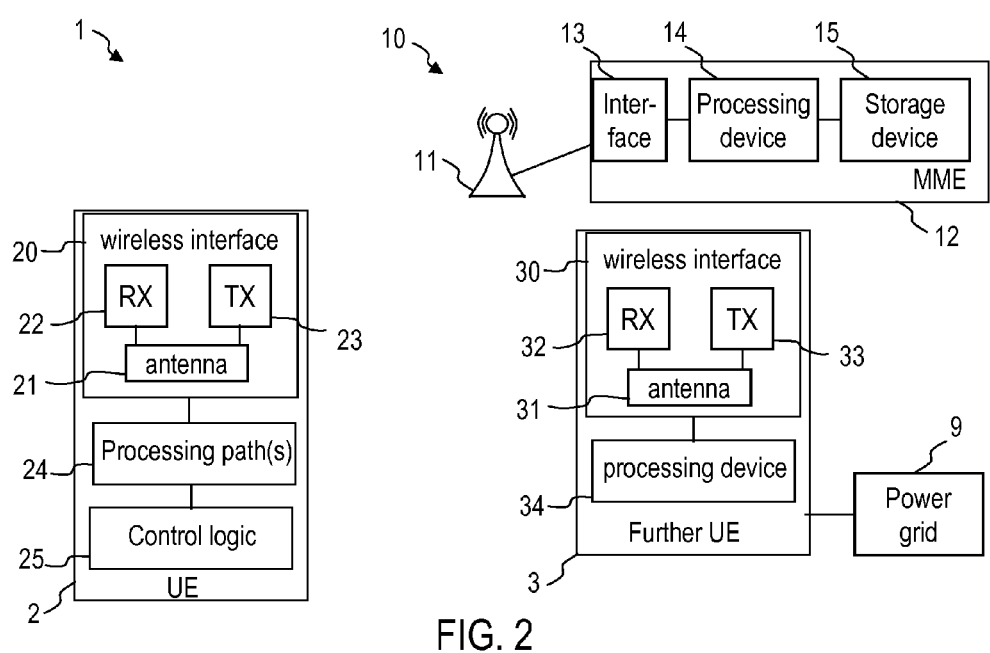
FIG. 2 is a schematic view of a communication system according to an embodiment.

FIG. 2 shows a block diagram view of the communication system 1 of FIG. 1.

The user equipment 2 has a wireless interface 20. The wireless interface 20 comprises an antenna 21, a receiver path 22 and a transmitter path 23. The wireless interface 20 is configured to communicate with the base station 11. The wireless interface 20 may be configured for communication over the eUTRA air interface. The wireless interface 20 may be configured to directly transmit signals to the further user equipment 3 and/or receive signals from the further user equipment 3. In the device-to-device discovery and communication, signals may be transmitted directly between the wireless interface 20 of the user equipment 2 and a wireless interface 30 of the further user equipment 3. The signals may be transmitted such that they are not received and processed in the radio access network of the cellular communication network.

The user equipment 2 may comprise one or several processing path(s) 24 for processing data packets received at the wireless interface 20. The processing path(s) 24 may be configured to perform signal processing in the digital domain.

In the power saving state of the user equipment 2, at least some of the components of the wireless interface 20 and the processing path(s) 24 may be turned off or may be operated with a reduced power consumption.

The user equipment 2 comprises a control logic 25 which controls in which operating state the user equipment 2 operates. The control logic 25 may cause components of the wireless interface 20 and/or the processing path(s) 24 to be selectively switched on and off, for example, or to be selectively provided with increased or reduced power levels. The control logic 25 may comprise one or several integrated circuits. The control logic 2 may comprise one or several processors, one or several microprocessors, one or several controllers, one or several microcontrollers, one or several application specific integrated circuits or a combination thereof.

The operating states may comprise a power saving state in which the user equipment 2 cannot be directly reached by the cellular communication network. The power saving state may correspond to the RRC idle state, but with the access stratum (AS) deactivated. The AS may be in a deep sleep state in which it is only operative to receive device-to-device signals, but no AS layer signals which are directly transmitted by the cellular communication network. Further operating states of the user equipment may comprise an RRC idle state with the AS activated and an RRC connected state, for example.

The control logic 25 of the user equipment 2 may be configured to process the device-to-device signal received from the further user equipment 3. The control logic 25 may be configured to determine whether the device-to-device signal is intended for the user equipment 2. The control logic 25 may apply a filter mask to determine whether the device-to-device signal received from the further user equipment 3 is intended for the user equipment 2. The control logic 25 may additionally determine whether the device-to-device signal triggers a transition of the user equipment from the power saving state into a further operating state or from the further operating state into the power saving state. The control logic 25 may determine whether the device-to-device signal includes a filter mask value which indicates that the user equipment 2 shall make a transition from the power saving state to the RRC idle state with AS activated or to the RRC connected state. For illustration, the control logic 25 may determine whether the device-to-device signal includes a filter mask value which indicates that the user equipment 2 shall perform a TAU and may control the wireless interface 20 to perform the TAU in response thereto.

Based on the processing of the device-to-device signal received from the further user equipment 3, the control logic 25 may control operation of the user equipment 2. The control logic 25 may selectively activate and/or deactivate the access stratum (AS) layer. The control logic 25 may selectively activate and/or deactivate at least some functions on the access stratum (AS) layer. At least some further functions of the non-access stratum (NAS) layer may remain activated even when the AS layer is deactivated in the power saving state. After the user equipment has entered the power saving state, it is still configured to detect device-to-device signals. The user equipment 2 may periodically listen for device-to-device signals after it has entered the power saving state.

The control logic 25 may monitor other trigger events in addition to the device-to-device signal which causes a transition between different operating states. For illustration, expiry of a reachable timer may cause the user equipment 2 to make a transition from an RRC idle state with AS activated to a power saving state in which at least some AS layer functions are deactivated. A transition from the power saving state to the RRC idle state with AS activated may be caused by either one of expiry of a trigger for a periodic TAU, for example, or receipt of the device-to-device signal from the further user equipment 3 which causes the user equipment 2 to change its operating state so as to become reachable by the cellular communication network.

The user equipment 2 may be operative to signal to the cellular communication network that it can be woken up from a power saving state by device-to-device communication, even when the user equipment 2 is not directly reachable for the cellular communication network in the power saving state. The user equipment 2 may transmit a message to the MME 12 or another cellular network node to indicate that the user equipment 2 is operative to change its operating state in response to device-to-device signalling. The user equipment 2 may selectively set a flag to indicate that the user equipment 2 can be woken up from the power saving state to a different operating state, e.g. to an RRC idle state with AS activated or to an RRC connected state. The flag may be set in one bit of the message. The flag may be included in several bits of the message. The message may be a NAS attach/TAU request message, for example. The message may include additional parameters, e.g. one or several timer values. The message may be transmitted from the user equipment 2 to the MME 12. The further user equipment 3 comprises the wireless interface 30. The wireless interface 30 may comprise an antenna 31, a receiver path 32 and a transmitter path 33. The wireless interface 20 may be configured for communication over the eUTRA air interface. The wireless interface 30 may be configured to directly transmit signals to the user equipment 2 and/or receive signals from the user equipment 2. In the device-to-device discovery and communication, signals may be transmitted directly between the wireless interface 30 of the further user equipment 3 and the wireless interface 20 of the user equipment 2. The signals may be transmitted such that they are not received and processed in the radio access network of the cellular communication network.

The further user equipment 3 comprises a processing device 34. The processing device 34 may comprise one or several integrated circuits. The processing device 34 is configured to receive a request from the MME 12 which causes the further user equipment 3 to transmit a device-to-device signal to the user equipment 2. The further user equipment 3 may transmit the device-to-device signal to the user equipment 2 to cause the user equipment 2 to wake up from the power saving state. The device-to-device signal may be a broadcast or multicast signal transmitted by the further user equipment 3 to all user equipments in a group of user equipments. The further user equipment 3 may generate and transmit the device-to-device signal in accordance with a filter mask which indicates that the device-to-device signal is intended for the user equipment 2. The further user equipment 3 may generate and transmit the device-to-device signal such that a filter mask value is added which indicates that the user equipment 2 shall change its operating state such that it becomes reachable for the cellular communication network. The device-to-device signal may be a device-to-device discovery signal or a device-to-device communication signal or a device-to-device synchronization signal.

The further user equipment 3 may be selected by the MME 12 for transmitting the device-to-device signal to the user equipment 2. The MME 12 may apply different criteria to select the further user equipment 3 from a plurality of active user equipments registered with the cellular communication network and located in the same cell 8 as the user equipment 2. For illustration, the further user equipment 3 may be a device which is connected to a power grid 9 and for which battery lifetime is not an issue. The MME 12 may take additional or alternative information into account when selecting the further user equipment 3. For illustration, when position information is available for the last position of the user equipment 2, the MME 12 may select the further user equipment 3 such that the further user equipment 3 and the user equipment are located in proximity to each other to perform the device-to-device discovery and communication.

The MME 12 comprises an interface 13 to receive a message transmitted from the user equipment 2. The message may include a flag or another information element which indicates whether the user equipment 2 can be made to change its operating state from a power saving state to a further state in which the user equipment 2 monitors paging signals and system information or is otherwise reachable for the cellular communication network. The MME 12 comprises a processing device 14 which is configured to process the message received from the user equipment 2. The processing device 14 is configured to determine whether the message received from the user equipment 2 indicates that the MME 12 can cause the operating state of the user equipment 2 to change by using device-to-device discovery or device-to-device communication, even when the user equipment 2 is in the power saving state. The processing device 14 may determine whether the message received from the user equipment 2 includes a flag or another information element which indicates that the user equipment 2 can be woken up by using device-to-device discovery or device-to-device communication.

The MME 12 comprises a storage device 15. The MME 12 may be configured to store information on whether the user equipment 2 can be caused to change its operating state by using device-to-device discovery or device-to-device communication in the storage device 15. The information, e.g. the flag which indicates whether the user equipment 2 can be caused to change its operating state by using device-to-device discovery or device-to-device communication, can be stored in the MME 12 together with location information which indicates the cell 8 in which the user equipment 2 is located or in combination with other information.

The MME 12 may be configured to monitor whether the user equipment 2 has entered a power saving state in which it cannot be reached directly by the cellular communication network. For illustration, the user equipment 2 may transmit a timer value for a reachable timer to the MME 12. The MME 12 may monitor whether the reachable timer has expired after a RRC connection release, which causes the user equipment to enter the power saving state.

When the MME 12 detects that it cannot directly reach the user equipment 2, the MME 12 may request the further user equipment 3 to transmit a device-to-device discovery signal or a device-to-device communication signal or a device-to-device synchronization signal to the user equipment 2. The MME 12 may cause the further user equipment 2 to transmit the device-to-device signal in accordance with a filter mask which defines that the device-to-device signal is intended for the user equipment 2 and with a filter mask value which indicates that the user equipment 2 shall make a transition from the power saving state to a further state in which it can be reached by the cellular communication network. In response to the request from the MME 12, the further user equipment 3 may broadcast the device-to-device signal. All user equipment in proximity to the further user equipment 3 may receive the device-to-device signal and may process it to determine whether it is intended to be received by them.

The operating states of the user equipment 2 may have any one of a variety of configurations, and device-to-device signals may be used to cause a transition between at least two or more than two of the operating states.

Figure 3:
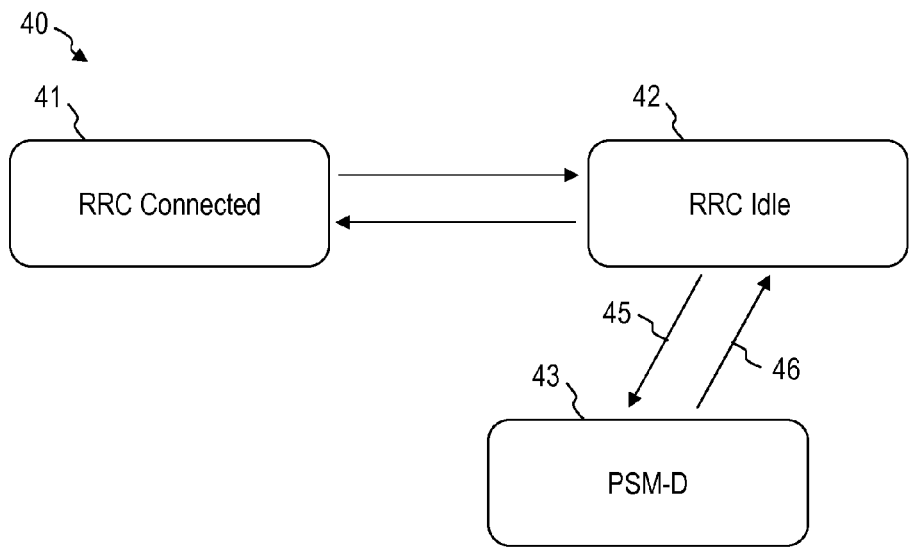
FIG. 3 is a diagram which shows operating states of a user equipment according to an embodiment.

FIG. 3 is a diagram 40 which shows operating states of a user equipment according to an embodiment. The user equipment has an RRC connected state 41 and an RRC idle state 42. The user equipment has a power saving state 43, which is referred to as a "Power Save Mode-D2D-reachable" (PSM-D) in FIG. 3. The power saving state 43 may be a sub-state of the RRC idle mode. In the power saving state 43, the user equipment may operate such that it does not monitor paging signals or system information broadcast by the cellular communication network. By contrast, in the RRC idle state 42, the user equipment may be configured to monitor paging signals or system information broadcast by the cellular communication network.

In the power saving state 43, the access stratum (AS) layer or at least some functions of the AS layer may be deactivated. In the power saving state 43, the AS layer or at least some functions of the AS layer may be reduced. The power saving state 43 may be a state which allows the user equipment to device whether AS layer functions are selectively deactivated. Power consumption may thereby be reduced. In the RRC idle state 42 the AS layer may be activated.

In the power saving state 43, the user equipment still monitors for a device-to-device signal which causes the user equipment to wake up from the power saving state 43. A transition 45 from the RRC idle state 42 to the power saving state 43 may be triggered by an expiry of a reachable timer. The reachable timer value may be transmitted by the user equipment to the MME.

A transition 46 from the power saving state 43 to the RRC idle state 42 may be triggered by a device-to-device discovery signal or a device-to-device communication signal or a device-to-device synchronization signal which is received by the user equipment from a further user equipment to wake up the user equipment. The device-to-device discovery signal or the device-to-device communication signal or the device-to-device synchronization signal may include an indicator which indicates that the user equipment shall become reachable for the cellular communication network.

The transition 46 may be performed in various ways. In some implementations, the user equipment may perform a TAU which causes the user equipment to at least temporarily enter the RRC connected state 41. In other implementations, the user equipment may enter the RRC idle state 42 for at least a pre-defined time period to listen for paging signals or other system information.

The transition 46 from the power saving state 43 to the RRC idle state 42 may be triggered by other events in addition to being controlled by a device-to-device signal. For illustration, expiry of a periodic TAU timer may cause the user equipment to perform a TAU procedure on a periodic basis and to enter the RRC idle state 42 for this purpose.

Transitions from the RRC connected state 41 to the RRC idle state 42 may be caused by a RRC connection release. Transitions from the RRC idle state 42 to the RRC connected state 41 may be caused by a RRC connection establishment or RRC connection reconfiguration, for example.

Figure 4:
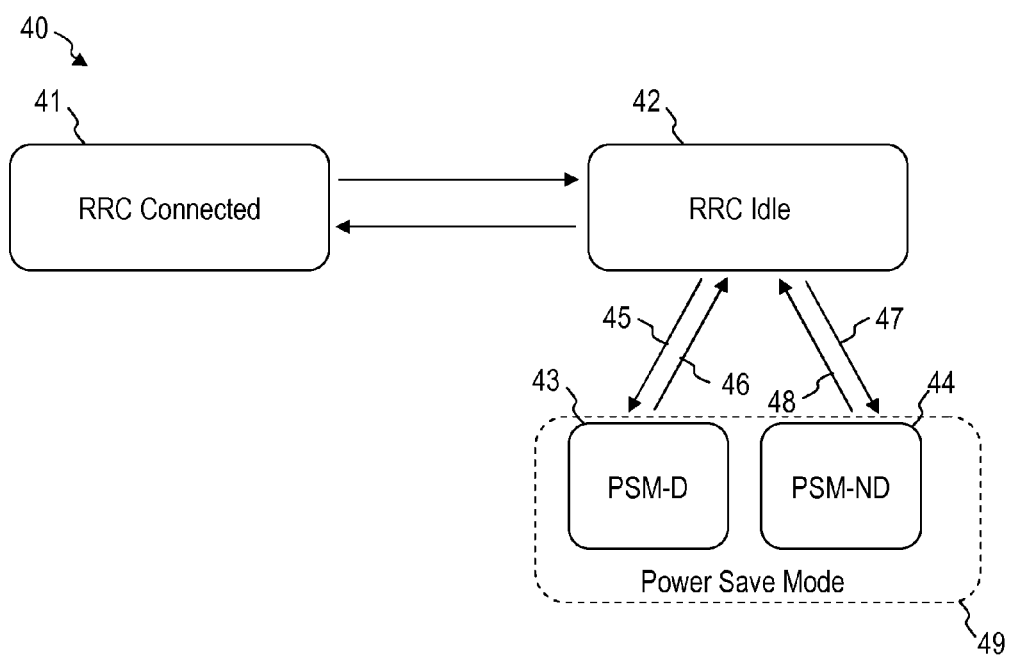
FIG. 4 is a diagram which shows operating states of a user equipment according to an embodiment.

FIG. 4 is a diagram 40 which shows operating states of a user equipment according to an embodiment. In addition to a power saving state 43 in which the user equipment can be woken up by device-to-device signals, the user equipment may have a "Power Save Mode-No-device-to-device reachability" (PSM-ND) state 44. In the PSM-ND state 44, the AS layer may be deactivated and the user equipment may be configured such that it cannot be caused to become reachable for the cellular communication network by device-to-device signals. A transition 47 from the RRC idle state 42 to the PSM-ND state 44 may be triggered by expiry of a reachable timer. A transition 48 from the PSM-ND state 44 to the RRC idle state 42 may be triggered by expiry of a periodic TAU timer which causes the user equipment to periodically listen for paging signals, for example. When operating in the PSM-ND state 44, device-to-device signals will not cause the user equipment to wake up to a further state in which it monitors paging signals or other system information.

The user equipment may take a decision on which of the states 43, 44 will be entered upon expiry of a reachable timer. The user equipment may transmit a message to the MME which includes a flag or other information element to indicate whether the user equipment can be woken up by using device-to-device signals (power saving state 43) or cannot be woken up by using device-to-device signals (PSM-ND state 44). The flag may be included in a NAS attach/TAU request message, for example.

Alternatively or additionally, the cellular communication network may take a decision on whether the user equipment shall enter the power saving state 43 from which it can be woken up by device-to-device signals or the PSM-ND state 44 from which it cannot be woken up by device-to-device signals. The cellular communication network may inform the user equipment about the state 43, 44 which is to be entered at expiry of a reachable timer in a RRC connection release message or a NAS attach/TAU response message, for example.

Figure 5:
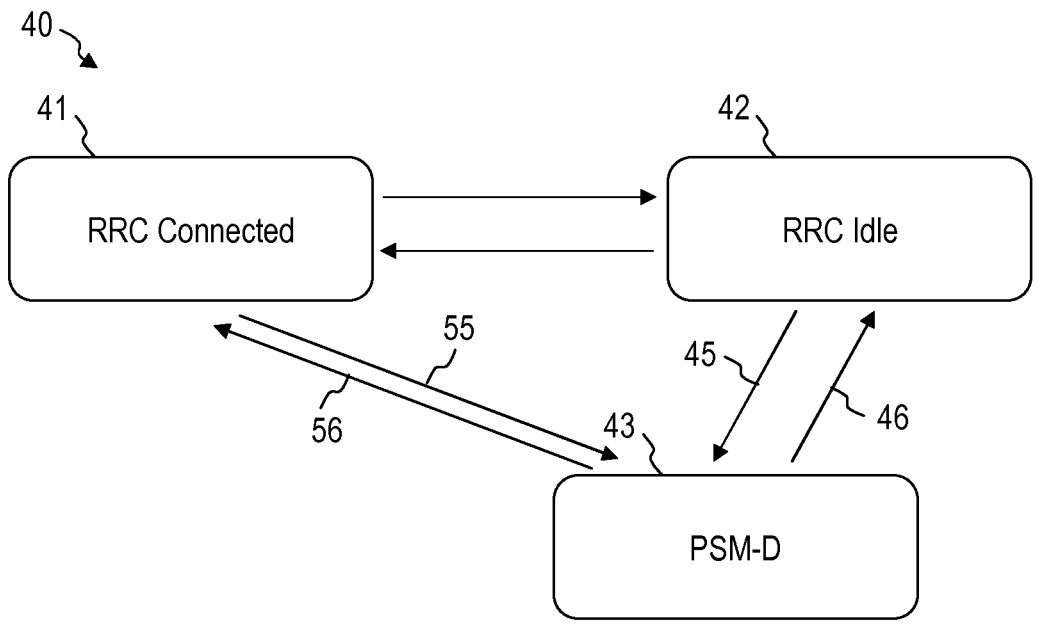
FIG. 5 is a diagram which shows operating states of a user equipment according to an embodiment.

FIG. 5 is a diagram 40 which shows operating states of a user equipment according to an embodiment. The user equipment may be configured to make a transition 56 from the power saving state 43 to the RRC connected state 41. The transition 56 may be triggered by a device-to-device signal, which may be device-to-device discovery signal or a device-to-device communication signal or a device-to-device synchronization signal. The device-to-device signal may include paging information from the cellular communication network which is relayed by the further user equipment to the user equipment.

The control logic of the user equipment may analyze a device-to-device signal which indicates that the user equipment shall become reachable for the cellular communication network. The control logic may determine whether the device-to-device signal includes paging information. If the device-to-device signal includes the paging information, the user equipment may make a transition directly to the RRC connected state 41. Otherwise, the user equipment may enter the RRC idle state 42 to listen for paging signals or system information from the cellular communication network.

The user equipment may be configured to make a transition 55 from the RRC connected state 41 directly to the power saving state 43.

Figure 6:
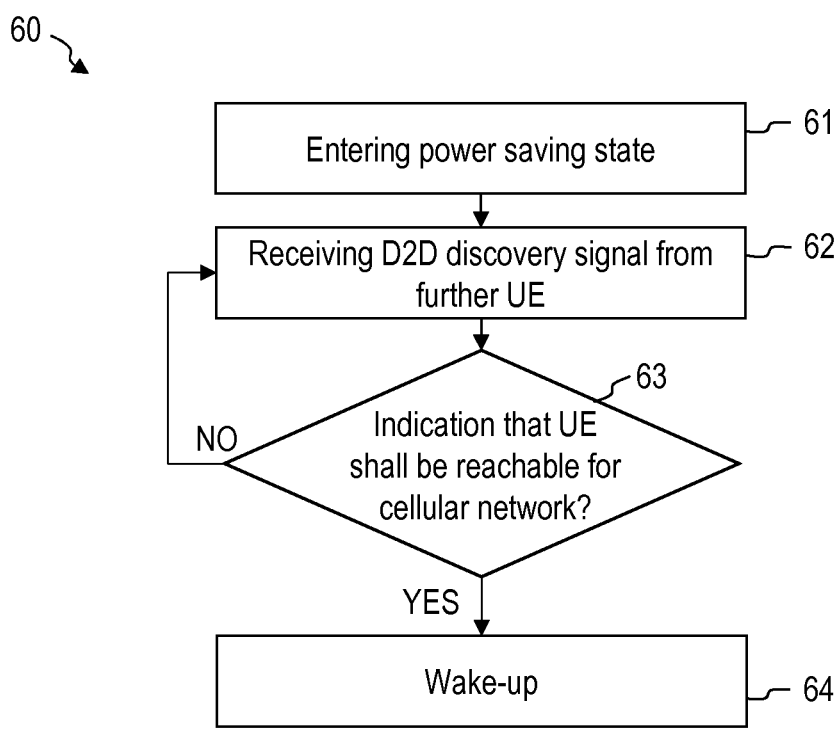
FIG. 6 is a flow chart of a method according to an embodiment.

FIG. 6 is a flow chart of a method 60 according to an embodiment. The method 60 may be performed by the user equipment according to an embodiment.

At 61, the user equipment enters a power saving state. The power saving state may be a state in which the access stratum (AS) layer is deactivated. The power saving state may be a state in which at least one AS layer function or several AS layer functions are deactivated or reduced. A reduction in AS layer functions may be implemented by performing the respective functions less frequently. The power saving state may be a state in which the user equipment does not listen for paging signals or system information from the cellular communication network. The user equipment may trigger a reachable timer when it enters a RRC idle state in which the AS layer is still activated, and may enter the power saving state by deactivating the AS layer when the reachable timer expires.

After the user equipment has entered the power saving state, the user equipment may still listen for device-to-device discovery signals and/or device-to-device communication signals and/or device-to-device synchronization signal. The user equipment may intermittently listen for such device-to-device signals after it has entered the power saving state. The user equipment may periodically listen for such device-to-device signals after it has entered the power saving state.

At 62, the user equipment receives a device-to-device discovery signal from a further user equipment. The device-to-device discovery signal is received at the wireless interface which is also operative to transmit control and data packets to the cellular communication network and to receive control and data packets from the cellular communication network.

At 63, the user equipment determines whether the received device-to-device discovery signal indicates that the user equipment shall change its operating state to become reachable for the cellular communication network. The user equipment may apply a filter mask to determine whether the device-to-device discovery signal is intended for the user equipment. The user equipment may determine whether the device-to-device discovery signal includes an indicator, e.g. a filter mask value, which indicates that the user equipment shall change its operating state to become reachable for the cellular communication network. If the device-to-device discovery signal does not indicate that the user equipment shall change its operating state to become reachable for the cellular communication network, the method may return to step 62.

At 64, if the received device-to-device discovery signal indicates that the user equipment shall change its operating state to become reachable for the cellular communication network, the user equipment changes its operating state such that it is reachable for the cellular communication network. The user equipment may perform a TAU procedure and may listen for paging signals or other system information for at least a pre-defined time period. Alternatively or additionally, the user equipment may enter the RRC idle state for at least a pre-defined time period without performing a TAU procedure to listen for paging signals or system information. Alternatively or additionally, the user equipment may enter the RRC connected state if the received device-to-device discovery signal includes paging information from the cellular communication network.

The user equipment may, but does not need to complete the device-to-device discovery procedure with the further user equipment when the device-to-device discovery signal indicates that the user equipment shall change its operating state to become reachable for the cellular communication network. The user equipment may be configured to respond to the device-to-device discovery signal and the further user equipment may be configured to inform the MME that the user equipment becomes reachable. In other embodiments, the user equipment does not need to complete the device-to-device discovery, and the device-to-device discovery signal may be used merely as a carrier message to wake up the user equipment.

Figure 7:
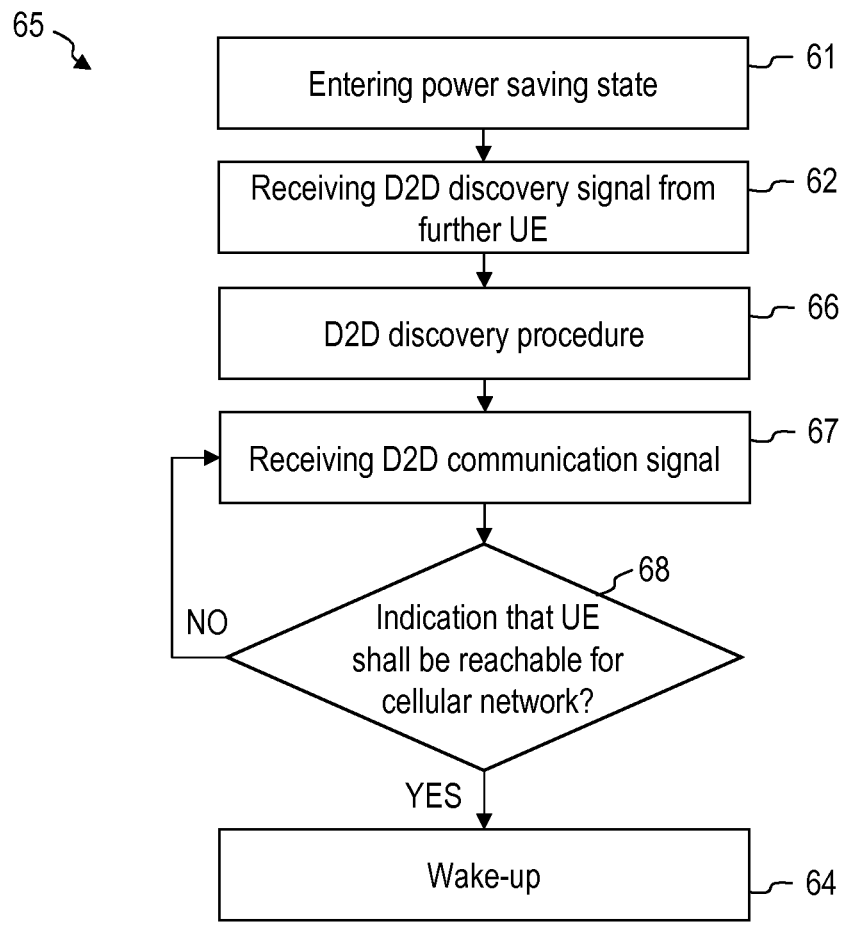
FIG. 7 is a flow chart of a method according to an embodiment.

FIG. 7 is a flow chart of a method 65 according to an embodiment. The method 65 may be performed by the user equipment according to an embodiment. In the method 65, a device-to-device communication signal is used to inform the user equipment that it shall change its operating state so as to listen to paging signals or system information. After the user equipment enters the power saving state at 61 and receives a device-to-device discovery signal at 62, a device-to-device discovery procedure is completed at 66.

At 67, the user equipment receives a device-to-device communication signal from the further user equipment.

At 68, the user equipment determines whether the received device-to-device communication signal indicates that the user equipment shall change its operating state to become reachable for the cellular communication network. The user equipment may apply a filter mask to determine whether the device-to-device communication signal is intended for the user equipment. The user equipment may determine whether the device-to-device communication signal includes an indicator, e.g. a filter mask value, which indicates that the user equipment shall change its operating state to become reachable for the cellular communication network. If the device-to-device communication signal does not indicate that the user equipment shall change its operating state to become reachable for the cellular communication network, the method may return to step 67. The user equipment may continue to monitor for the device-to-device communication signal at step 67 until a TAU timer expires and/or until a mobile originating (MO) transmission takes place and/or until the device-to-device communication signal is detected.

At 64, if the received device-to-device communication signal indicates that the user equipment shall change its operating state to become reachable for the cellular communication network, the user equipment changes its operating state such that it is reachable for the cellular communication network. The user equipment may return to the power saving state, e.g. after a pre-defined time period in RRC connected state or RRC idle state lapsed and/or when a TAU procedure has been completed. Step 64 may be implemented as explained with reference to FIG. 6.

The user equipment according to embodiments may be configured such that it can be caused to wake up from the power saving state by device-to-device signal transmission, even when the user equipment does not have a timer for periodic TAU. The user equipment may also be configured such that, in addition to a device-to-device signal with a corresponding indicator for wake-up, expiry of a periodic TAU timer may also cause the user equipment to enter the RRC idle state with AS activated, for example.

Figure 8:
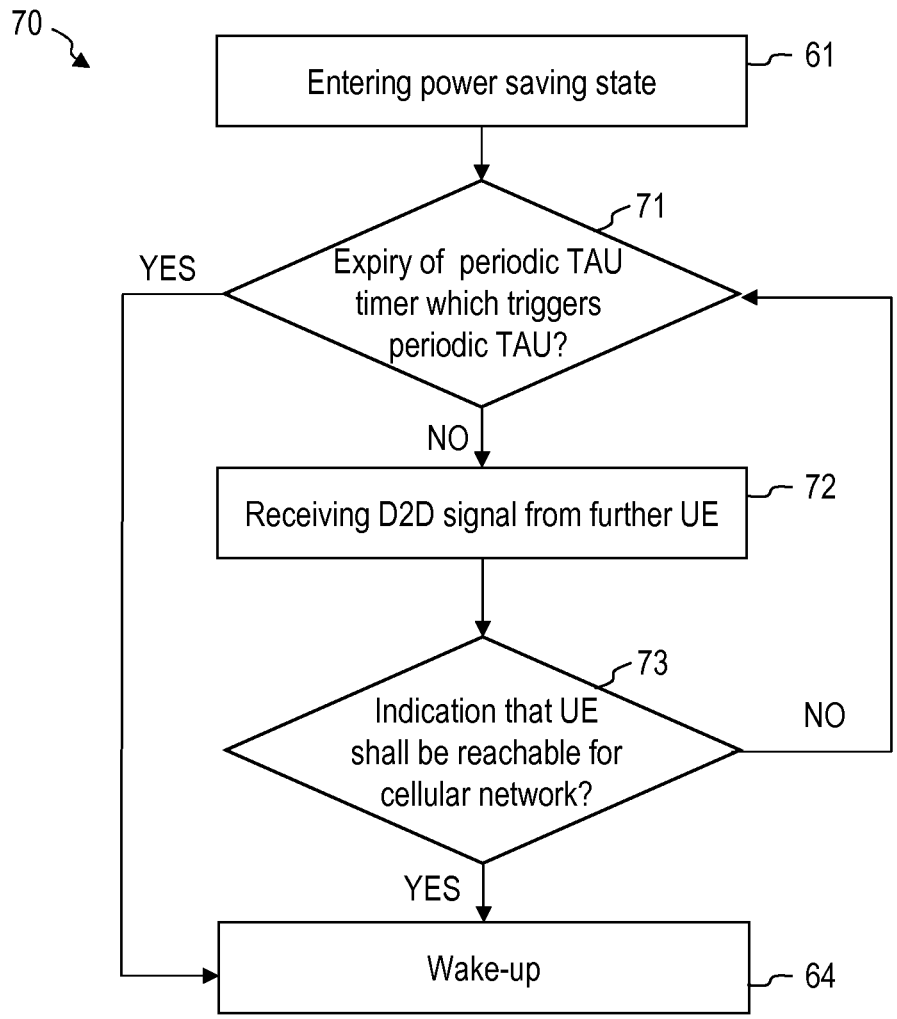
FIG. 8 is a flow chart of a method according to an embodiment.

FIG. 8 is a flow chart of a method 70 according to an embodiment. The method may be performed by the user equipment according to an embodiment.

At 61, the user equipment enters the power saving state. A periodic TAU timer may be started. The timer value of the periodic TAU timer may be transmitted by the user equipment to the MME, e.g. in a NAS attach/TAU request message, before the user equipment enters the power saving state. The timer value of the periodic TAU timer may be transmitted from the MME to the user equipment, e.g. in a NAS attach/TAU accept message, before the user equipment enters the power saving state.

At 71, the user equipment monitors whether the timer for a periodic TAU expires. Expiry of the periodic TAU timer causes the user equipment to proceed to step 64. At 64, the user equipment activates the AS layer and listens for paging signals or system information from the cellular communication network. The periodic TAU timer may be reset and the method may return to step 61.

At 72, when the periodic TAU timer is not yet expired, the user equipment may receive a device-to-device signal from the further user equipment. The device-to-device signal may be a device-to-device discovery signal or a device-to-device communication signal.

At 73, the user equipment determines whether the device-to-device signal indicates that the user equipment shall change its operating state, e.g. by activating the AS layer. The user equipment may process the device-to-device signal as explained with reference to step 63 of the method 60 of FIG. 6 or as explained with reference to step 68 of the method 65 of FIG. 7. If the user equipment determines that the device-to-device signal indicates that the user equipment shall change its operating state, the method may proceed to step 64. The AS layer may be activated. The user equipment may perform a TAU or may otherwise enter the RRC idle state with AS layer activated to be reachable for the cellular communication network. The user equipment may return to the power saving state, e.g. after a pre-defined time period expired and/or after the TAU procedure has been completed. If the user equipment determines that the device-to-device signal does not indicate that the user equipment shall change its operating state, the method may return to step 71.

Figure 9:
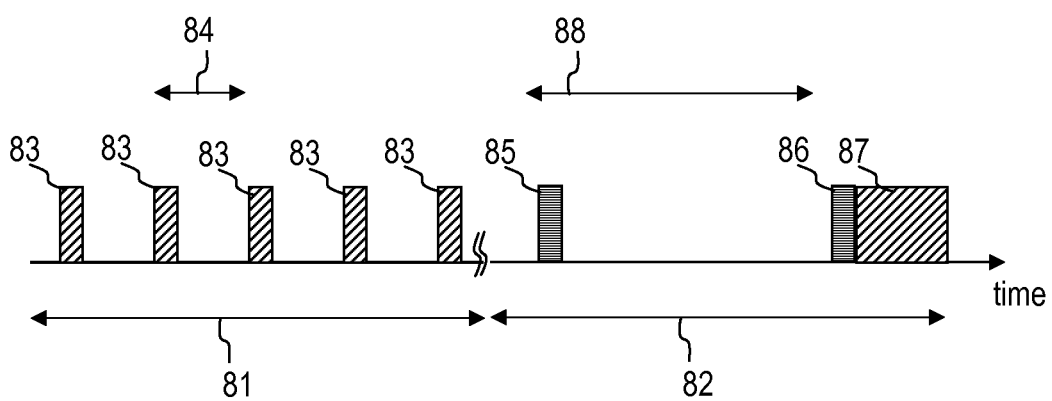
FIG. 9 illustrates operation of a user equipment according to an embodiment.

FIG. 9 illustrates the operation of a user equipment according to an embodiment.

The user equipment may be configured to operate such that it periodically performs TAU procedures in a time interval 81. This may be the case when the user equipment enters a the PSM-ND state 44 of FIG. 4 from which it cannot be woken up by a device-to-device signal. The operating state to the user equipment may periodically change to a RRC idle state with activated AS layer, as shown at 83. When in the RRC idle state with activated AS layer, the user equipment may listen for pilot signals or system information from the cellular communication network. The transitions define the paging occasions (PO). In a time period 84 between successive POs, the user equipment may be in the power saving state in which it cannot receive paging signals.

The user equipment may enter the power saving state from which it can be woken up by a device-to-device signal in a time interval 82. In the time interval 82, the periodic TAU timer may be set such that the user equipment does not perform periodic TAU procedures, for example. In the time interval 82, the user equipment may periodically listen for device-to-device discovery signals at 85, 86. The period 88 may correspond to the device-to-device discovery period. The period 88 may be set longer, e.g. much longer, than the time period 84 between successive POs. The period 88 may be increased to be longer than the device-to-device discovery period because a discovery signal may be repeated several times. This increases the sleep time 84 between the periods 85, 86 in which the device listens for device-to-device discovery signals.

When a device-to-device signal is detected in the period 86 which causes the user equipment to wake up, the user equipment may enter a further operating state 87 in which it is reachable for the cellular communication network by direct signal transmission from the base station to the user equipment. For illustration, the user equipment may activate the AS layer to enter the further operating state 87.

Figure 10:
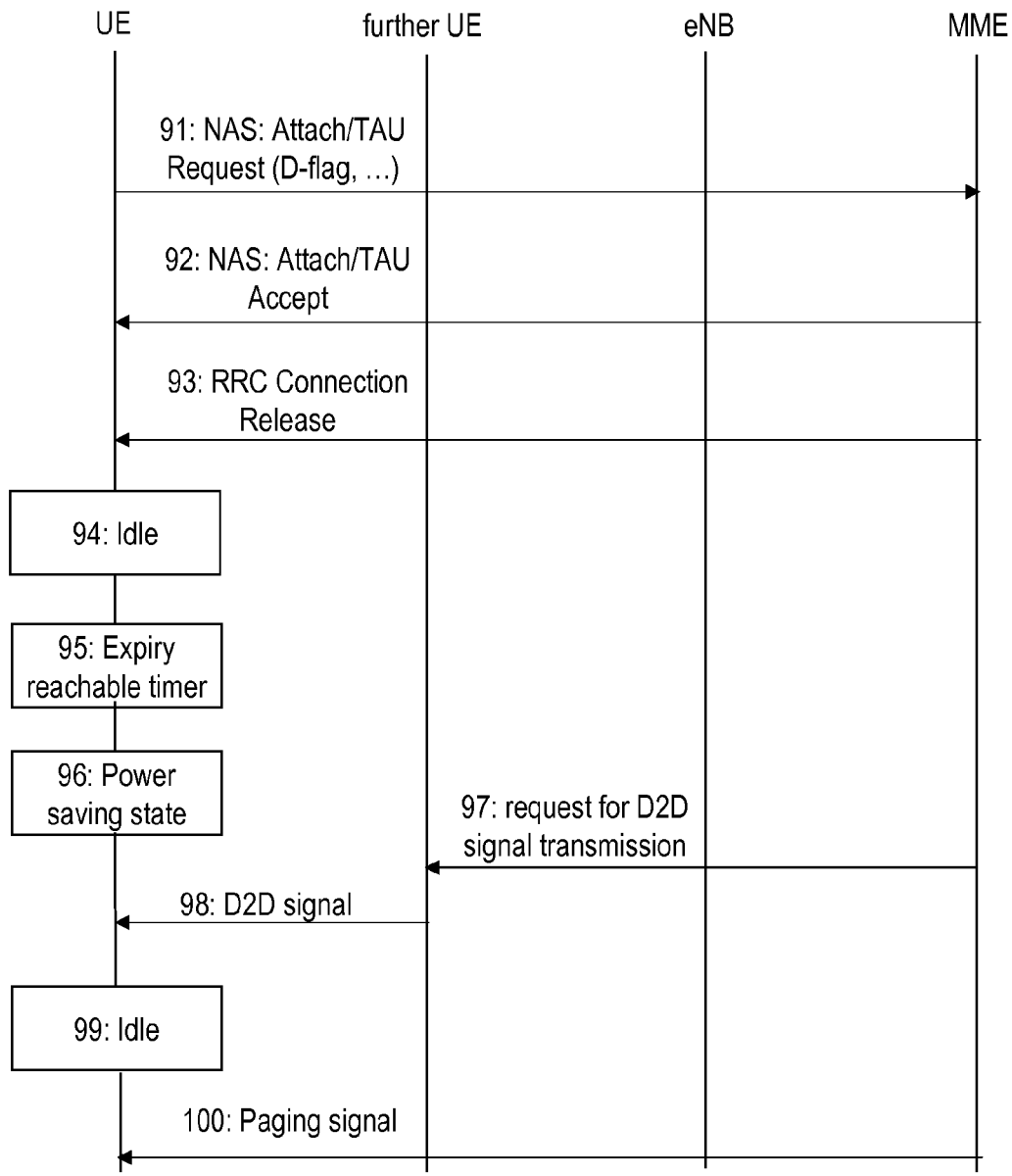
FIG. 10 is a diagram which shows a signalling in a communication system according to an embodiment.

FIG. 10 is a diagram which shows a signalling in a communication system according to an embodiment.

The user equipment may transmit a NAS attach/TAU request message 91 to the MME. The NAS attach/TAU request message may include a flag, D-flag, which indicates whether the user equipment can be woken up by device-to-device signals when the user equipment is in the power saving state. Additional parameters may be included in the NAS attach/TAU request message 91. The additional parameters may include one or several timer values, for example. The MME may transmit a NAS attach/TAU accept 92 to the user equipment.

The additional parameters may include information on the further user equipment which is signalled by the user equipment to the MME in the message 91. For illustration, the user equipment may detect the further user equipment by device-to-device discovery prior to entering the power saving state and may inform the MME of the further user equipment prior to entering the power saving state.

Alternatively or additionally to the NAS attach/TAU request message 91, an indicator indicating whether the user equipment can be woken up by a device-to-device signal when operating in the power saving state may be included in a RRC message, e.g. a UE ASSISTANCE INFORMATION.

A RRC connection setup and/or RRC connection reconfiguration may be performed in a conventional way.

A RRC connection release 93 causes the user equipment to enter an RRC idle state 94. Expiry of a reachable timer 95 causes the user equipment to enter the power saving state 96. In the power saving state 96, the user equipment cannot be reached directly by the cellular communication network but monitors for device-to-device signals from further user equipments different from the user equipment.

In order to wake up the user equipment, the MME transmits a wake-up request 97 to a further user equipment. The wake-up request 97 may include an identifier for the user equipment. The wake-up request 97 may optionally include paging information.

In response to the wake-up request 97, the further user equipment transmits a device-to-device signal 98 to the user equipment. The device-to-device signal 98 may be a device-to-device discovery signal or a device-to-device communication signal. The device-to-device signal 98 may include a value which indicates which user equipment or which group of user equipments is to be woken up. The device-to-device signal 98 may indicate that it is for waking up the user equipment or a group of user equipments.

The device-to-device signal 98 may be a scheduling assignment or associated data payload. The user equipment may monitor for scheduling assignments and either the scheduling assignment itself or the associated payload data may contain the wake-up message from the cellular communication network which is relayed to the user equipment in the device-to-device signal 98.

The user equipment monitors for the device-to-device signal 98 even when it has entered the power saving state 96. The user equipment detects the device-to-device signal 98. Receipt of the device-to-device signal triggers the user equipment to transition from the power saving state 96 to a further operating state. The further operating state may be the RRC idle state 99. The further operating state may also be the RRC connected state, e.g. when the device-to-device signal 98 includes paging information from the cellular communication network.

When the user equipment has entered the RRC idle state 99, it may monitor for paging signals 100 or for system information which is received at the wireless interface directly from the base station of the cellular communication network.

Figure 11:
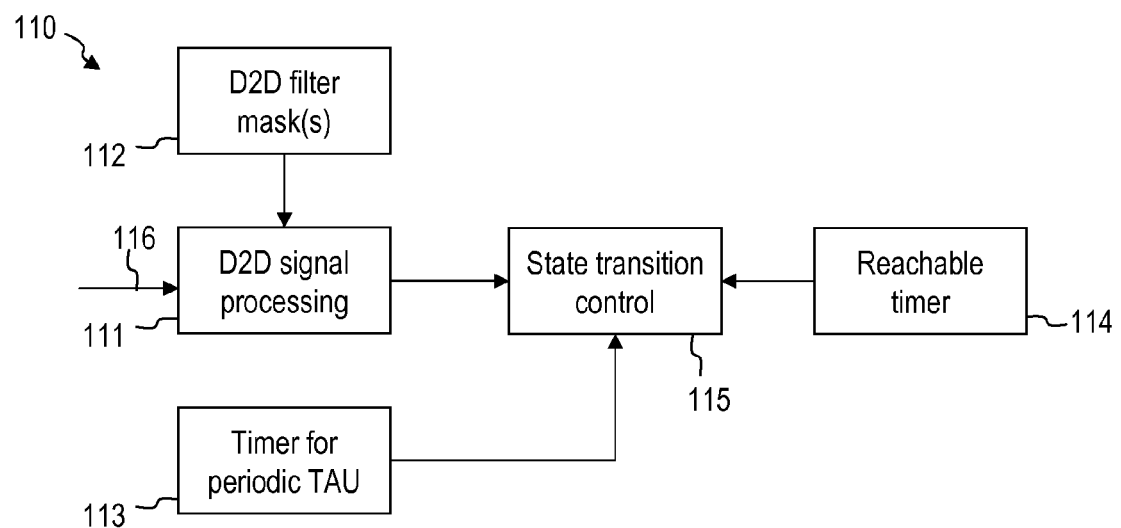
FIG. 11 is a block diagram of a user equipment according to an embodiment.

FIG. 11 is a functional block diagram 110 of a user equipment according to an embodiment. Some or all of the functional blocks may be implemented in the control logic of the user equipment.

The user equipment has a D2D signal processing module 111 for processing device-to-device signals. The D2D signal processing module 111 may be operative to process received device-to-device signals 116 even when the user equipment has entered a power saving state in which the access stratum (AS) layer is deactivated. The D2D signal processing module 111 may be operative to determine whether the received device-to-device signal 116 is a wake-up signal by which the cellular communication network requests the user equipment to make a transition to a further operating state in which it is reachable by the cellular communication network.

The user equipment may have a D2D filter mask module 112. The D2D signal processing module 111 may filter the received device-to-device signals 116 using a filter mask defined by the D2D filter mask module 112 to determine whether the user device-to-device signal 116 is intended for the user equipment or for a group of devices which includes the user equipment.

The user equipment has a state transition control module 115 for controlling transitions between operating state. The state transition control module 115 may be configured such that the user equipment transitions from the power saving state to the further state in which it can monitor for paging signals from the cellular communication network when the D2D signal processing module 111 detects that the received device-to-device signal 116 is the wake-up signal.

The user equipment may comprise a periodic TAU timer 113. The initial value of the periodic TAU timer 113 may be signalled to the MME and/or may be received from the MME. Expiry of the periodic TAU timer 113 may respectively trigger the state transition control module 115 to perform a TAU.

The user equipment may comprise a reachability timer 114. The initial value of the reachability timer 114 may be signalled to the MME and/or may be received from the MME. The reachability timer 114 may be started when the user equipment enters the RRC idle state with activated AS layer. Expiry of the reachability timer 114 may trigger the state transition control module 115 to deactivate the AS layer, such that the user equipment transitions into the power saving state.

Figure 12:
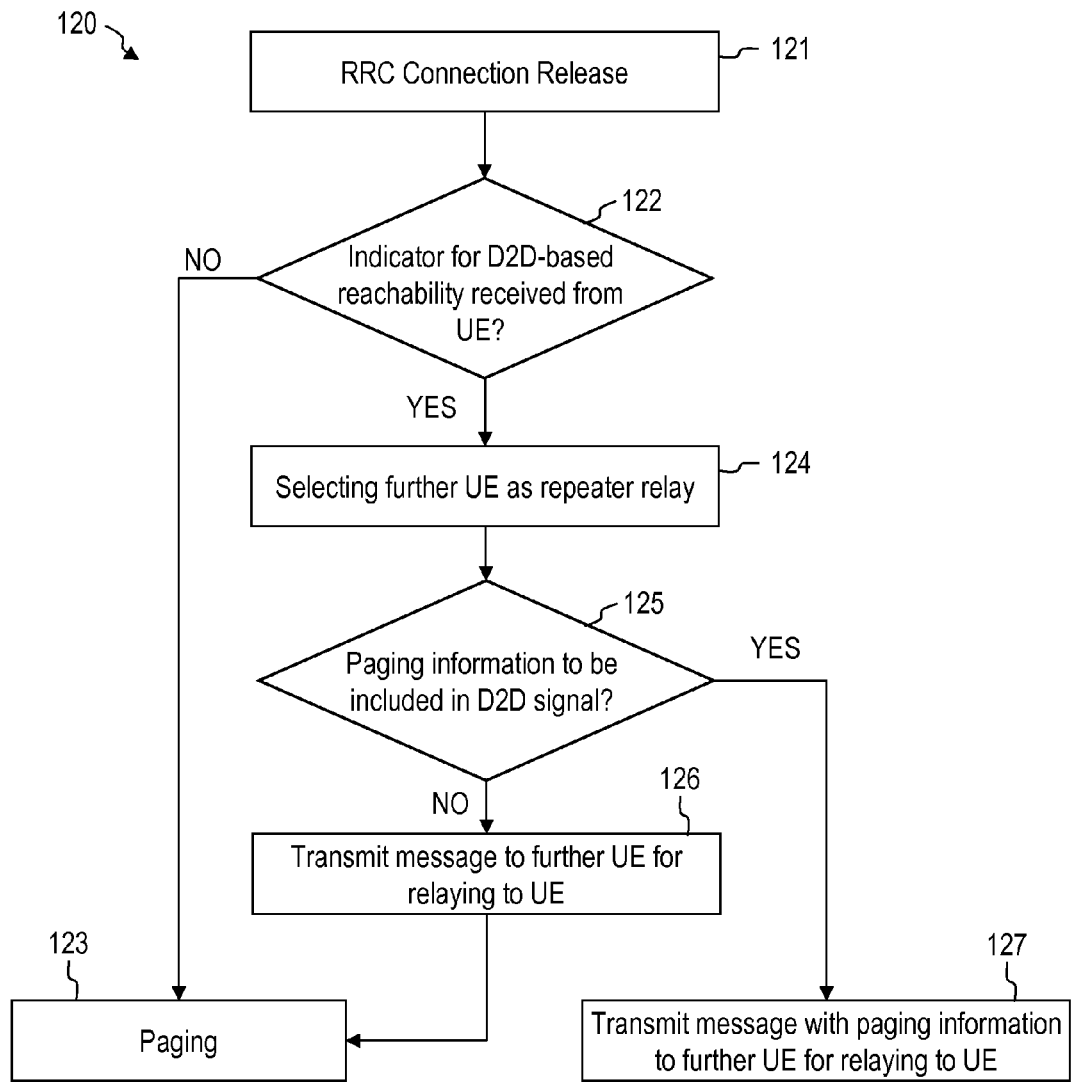
FIG. 12 is a flow chart of a method performed by a cellular communication network node according to an embodiment.

FIG. 12 is a flow chart of a method 120 according to an embodiment. The method 120 may be performed by the MME according to an embodiment.

At 121, a RRC connection release message may be transmitted. The user equipment may enter the RRC idle state with AS layer activated and, after expiry of a reachability timer, may deactivate the AS layer.

To establish a connection with the user equipment thereafter, the MME determines at 122 whether the user equipment has indicated that it can be woken up by a device-to-device discovery or communication signal. The corresponding information may be included as a flag or other information element in a NAS attach/TAU request received from the user equipment before the RRC connection release is transmitted at 121. If the user equipment has not indicated that it can be woken up by device-to-device signals, conventional paging may be performed at 123, and the MME may wait for a TAU or mobile originating data transmission which causes the user equipment to be reachable for the MME.

If the MME determines that the user equipment has indicated that it can be woken up by a device-to-device discovery or communication signal, at 124 the user equipment may select a further user equipment for transmitting the device-to-device signal which causes the user equipment to wake up from the power saving state. The selection of the further user equipment may be performed before the user equipment enters the power saving state. The MME may select the further user equipment such that it is located in the same cell as the user equipment. The MME may select the further user equipment to be a device which is connected to an electric power grid and which can therefore act as a repeater relay without creating battery lifetime problems for the further user equipment.

At 125, the MME determines whether paging information shall be included in the wake up signal which is to be relayed to the user equipment as the device-to-device signal. For illustration, the MME may determine whether the user equipment shall be made to directly transition into a RRC connected state, and the paging information may be included in the wake up signal if the user equipment shall be made to directly transition into a RRC connected state.

At 126, if the paging information does not need to be included in the device-to-device signal, the MME requests the further user equipment to transmit the device-to-device signal to the user equipment which causes the user equipment to wake up from the power saving state. The MME may cause the further user equipment to transmit a D2D discovery signal, a D2D scheduling assignment, or payload associated with the D2D scheduling assignment which includes a wake up message. The paging signals transmitted at 123 will be received by the user equipment.

At 127, if the paging information is to be included in the device-to-device signal, the MME requests the further user equipment to transmit the device-to-device signal to the user equipment. The paging information is transmitted to the further user equipment, and the further user equipment is caused to transmit the device-to-device signal including the paging information to the user equipment.

In the devices, systems and methods according to embodiments, the user equipment is reachable in a two-stage process. In a first stage, the user equipment receives a wake-up message which is included in a device-to-device discovery signal or a device-to-device communication signal or a device-to-device synchronization signal with added payload. In a second stage, when the user equipment performs a TAU or enters the RRC idle state by activating the AS layer the user equipment can be paged. Alternatively, the user equipment may be triggered to access the cellular communication network by including paging information in the wake up message which is relayed to the user equipment in the device-to-device discovery signal or the device-to-device communication signal or the device-to-device synchronization signal.

In the devices, systems and methods according to embodiments, the user equipment does not need to perform idle tasks other than monitoring for device-to-device signals when the user equipment is in the power saving state. The discovery signal monitoring may be performed at a frequency which is less than the paging occasion frequency.

In the devices, systems and methods according to embodiments, the user equipment may be a terminal for machine-to-machine (M2M) communication. The user equipment may be a machine type communication (MTC) device.

In the devices, systems and methods according to embodiments, the MME may cause the further user equipment to simultaneously relay the device-to-device signal to several user equipments. This allows the MME to concurrently wake up several MTC devices from their respective power saving states.

Various effects are attained by the devices, methods and systems according to embodiments. For illustration, the cellular communication network is provided with enhanced control over a user equipment, which allows the user equipment to be woken up from the power saving state even when the user equipment is unreachable by direct transmissions from the base station to the user equipment. The power saving state of the user equipment may provide a lower power consumption and increased battery lifetime compared to the RRC idle state with activated AS, for example, while allowing the user equipment to be woken up by device-to-device wake up signals.

While exemplary embodiments have been described with reference to the drawings, modifications may be implemented in other embodiments. For illustration, the user equipment and the further user equipment may be a MTC device or another terminal. Further, while exemplary network technologies have been described, embodiments of the invention may be used in combination with other network technologies.

While device-to-device signals may be used to cause the user equipment to transition from the power saving state to a RRC idle state or a RRC connected state, other transitions between operating states may also be controlled by relaying messages to the user equipment as device-to-device signals.

While the power saving state may be a state in which an AS layer or at least some functions of the AS layer are deactivated, the power saving state may also have other configurations.

Devices, systems and methods according to embodiments allow the cellular communication network to cause a user equipment to make transitions between different operating states, even when the user equipment is not directly reachable for the cellular communication network.

The invention claimed is:

1. A user equipment, comprising:
a wireless interface for communication with a cellular communication network, and
a control logic configured to control transitions of the user equipment between different operating states which include a power saving state,
the control logic being configured to process a device-to-device signal received directly from a further user equipment at the wireless interface and to selectively execute, in response to the received device-to-device signal, a transition of the user equipment between the power saving state and a further operating state different from the power saving state, the transition being triggered by the received device-to-device signal,
wherein the control logic is configured to control the wireless interface to perform a tracking area update, TAU, procedure in response to the device-to-device signal.

2. The user equipment of claim 1,
wherein the power saving state is a state in which at least some access stratum functions are deactivated or reduced compared to the further operating state which is different from the power saving state.

3. The user equipment of claim 2,
wherein the control logic is configured to selectively activate one or several access stratum functions in response to the device-to-device signal.

4. The user equipment of claim 3,
wherein a power consumption of the user equipment in the power saving state is less than a power consumption of the user equipment in a Radio Resource Control, RRC, idle state.

5. The user equipment of claim 2,
wherein the further operating state is a Radio Resource Control, RRC, idle state.

6. The user equipment of claim 1,
wherein the control logic is configured to control the wireless interface to perform the TAU procedure in response to the device-to-device signal and upon expiry of a timer.

7. The user equipment of claim 2,
wherein the control logic is configured to determine whether the device-to-device signal indicates that the user equipment is to be set to the further operating state to monitor paging signals from the cellular communication network in at least a pre-defined time interval.

8. The user equipment of claim 7,
wherein the control logic is configured to apply a filter mask to the device-to-device signal to determine whether the user equipment shall be set to the further operating state to monitor the paging signals in at least the pre-defined time interval.

9. The user equipment of claim 2,
wherein the further state is a Radio Resource Control, RRC, connected state.

10. The user equipment of claim 9,
wherein a power consumption of the user equipment in the power saving state is less than a power consumption of the user equipment in the RRC connected state, and
wherein the control logic is configured to control the wireless interface to perform the transition from the power saving state to the RRC connected state in response to the device-to-device signal.

11. The user equipment of claim 1,
wherein the wireless interface is configured to transmit a message to a node of the cellular communication network, the message comprising an indicator indicating that the user equipment is operative to be woken up by the device-to-device signal when the user equipment operates in the power saving mode.

12. The user equipment of claim 11,
wherein the message is an attach/TAU request message.

13. The user equipment of claim 1,
wherein the device-to-device signal is a device-to-device communication signal.

14. The user equipment of claim 1,
wherein the device-to-device signal is a device-to-device synchronization signal or a device-to-device discovery signal.

15. A cellular communication network node, comprising:
an interface configured to receive a message transmitted by a user equipment, and
a processing device coupled to the interface and configured
to determine whether the message includes an indicator which indicates that the user equipment, when operating in a power saving state, is operative to be woken up by a device-to-device signal, and
to selectively cause a further user equipment to transmit the device-to-device signal to the user equipment to wake up the user equipment from the power saving state.

16. The cellular communication network node of claim 15,
wherein the cellular communication network node is a Mobility Management Entity, MME.

17. The cellular communication network node of claim 15,
wherein the processing device is configured to select the further user equipment from a group of active user equipments registered with a cellular communication network.

18. A method of controlling operation of a user equipment which comprises a wireless interface for communication with a cellular communication network, the method comprising:

receiving, by the wireless interface, a device-to-device signal directly from a further user equipment;

processing, by a control logic of the user equipment, the received device-to-device signal;

executing, by the control logic of the user equipment, a transition of the user equipment between a power saving state and a further operating state different from the power saving state in dependence on a result of the processing, the transition being triggered by the received device-to-device signal; and controlling, by the control logic, the wireless interface to perform a tracking area update, TAU, procedure in response to the device-to-device signal.

19. The method of claim 18,
wherein the processing comprises:
   determining whether the received device-to-device signal is a wake-up signal for the user equipment, and
wherein the controlling comprises:
   activating an access stratum when the received device-to-device signal is the wake-up signal for the user equipment.

* * * * *